United States Patent Office

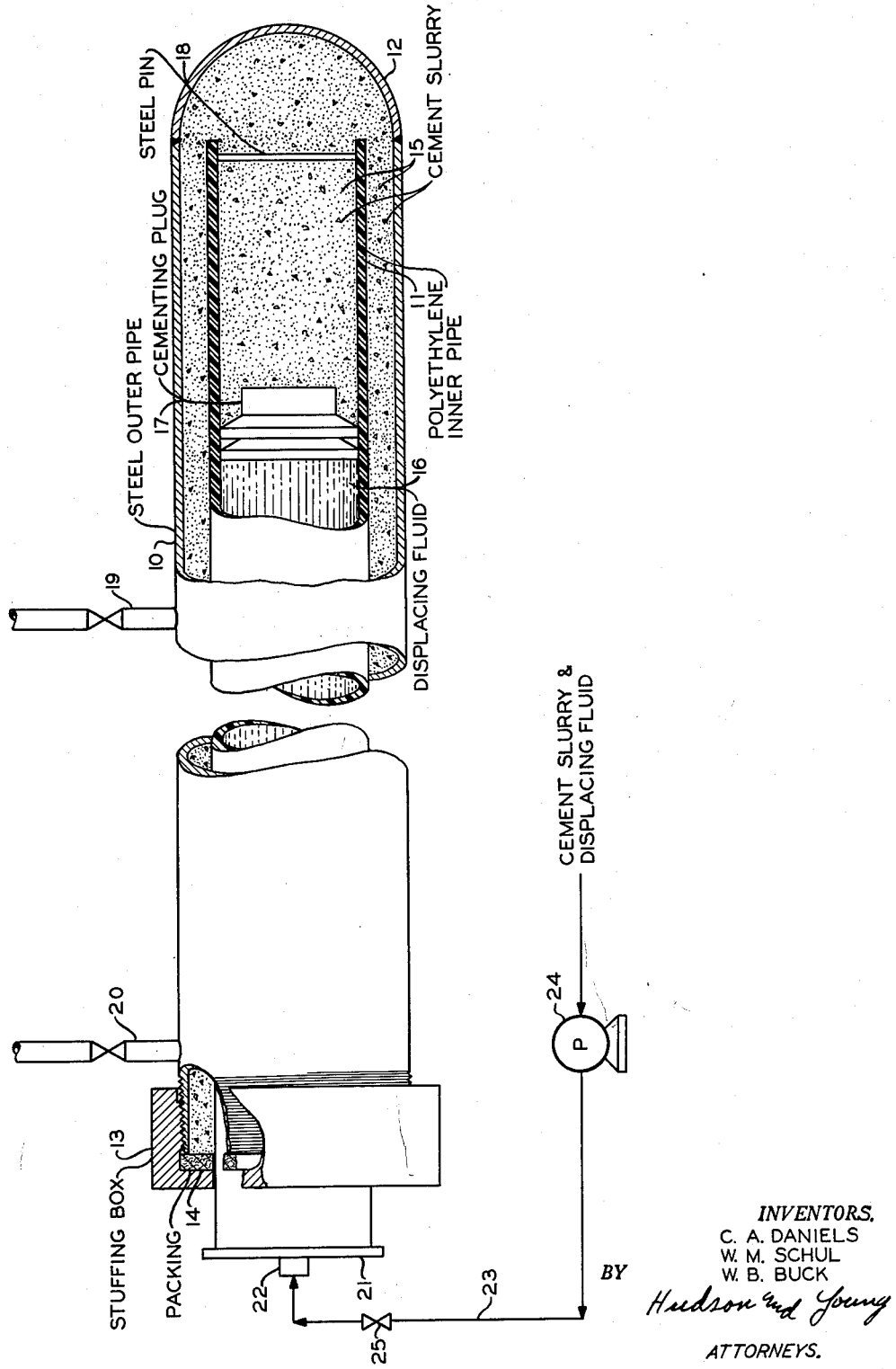

3,125,124
Patented Mar. 17, 1964

3,125,124
CONDUIT WITH CORROSION RESISTANT LINER
Charles A. Daniels, Bartlesville, Okla., William M. Schul, Renton, Wash., and William B. Buck, Oklahoma City, Okla., assignors to Phillips Petroleum Company, a corporation of Delaware
Filed Nov. 4, 1960, Ser. No. 67,390
4 Claims. (Cl. 138—141)

This invention relates to corrosion resistant conduits. In one aspect it relates to corrosion resistant conduits which are reinforced for use in high pressure service. In still another aspect this invention relates to a method for providing a corrosion resistant liner for a high pressure pipe so that the pipe is subjected to the internal pressure therein rather than the corrosion resistant liner.

For many years pipes and other conduits have been lined with hydraulic cement and such cement lined pipes have been used for handling oil field brines and other corrosive fluids, particularly fluids which are encountered in the petroleum industry. While these cement linings have provided a measure of protection for the pipe lines, there have often been failures in such installations which have presented an ever-present problem of detecting and replacing pipe lines or sections of pipe lines wherein the lining has failed. Minute cracks which sometimes occur in the lining, possibly as a result of expansion and contraction of the metal pipe or as a result of flexing the pipe during handling or during use, allow corrosive fluids to penetrate the lining and attack the pipe. Anything which causes a rupture of the hydraulic cement lining will tend to result in failure of the pipe when such pipe is used to transport corrosive fluids. In one particular installation where sulfate-reducing bacteria are known to be present in the crude oil and salt water being transported cement lined steel pipe has been found to be very little better than unlined steel pipe. Such bacteria have been found beneath the cement lining of cement lined pipe; however, if the cement lining allows the fluids being transported to come in contact with the metal pipe, corrosion can result in galvanic action or chemical action in addition to attack by bacteria.

Resinous or plastic materials such as polyvinylchloride, solid polyolefins, nylon, natural and synthetic rubber, and the like, have been proposed for use in conduits transporting corrosive fluids; however, such materials lack the tensile strength required for high pressure service and therefore the use of such materials has been limited.

It is a principal object of this invention to provide an impermeable, corrosion resistant liner for high pressure conduits so that the liner is not dependent upon its tensile strength to withstand the internal pressure of the conduit. Another object of the invention is to provide a high pressure conduit with a resinous liner wherein the annulus between the conduit and the liner is substantially filled with a hydraulic cement. Other and further objects and advantages of this invention will become evident to one skilled in the art upon study of this disclosure, including the detailed description of the invention and the drawing wherein:

The sole figure of the drawing is a schematic illustration, partly in section, of a preferred embodiment of the invention.

Referring now to the drawing, a section of line pipe 10 is shown with resinous inner pipe 11 being cemented into position. Pipe 10 is closed at one end, for example by bull plug 12, and the annulus between pipes 10 and 11 is sealed at the other end by any suitable device such as stuffing box 13 containing sealing means 14. Cement slurry 15, placed in resinous pipe 11, is displaced in the annulus between pipes 10 and 11 by pumping a displacing fluid 16 into pipe 11 behind a cementing plug 17. The cementing plug 17 seats against steel pin 18 or other impediment secured at the end of pipe 11. Entrapped air is vented through valved outlets indicated at 19 and 20. The end of pipe 11 which extends out of stuffing box 13 can be closed by a threaded cap 21 or other appropriate closing means. A packing gland 22 will enable the assembled pipes 10 and 11 to be rotated. Cement slurry and displacing fluid can be pumped into pipe 11 via conduit 23 and pump 24. Closing valves 19, 20 and 25 will maintain pressure on the fluids until the cement has set. When the cement is cured, the bull plug is removed and the ends of the pipe, resinous liner and cement filling are prepared for junction with another section of pipe or a fitting.

Sections of lined pipe or conduit can be joined together or joined to fittings or to vessels by any desired means. A particularly advantageous method for joining sections of lined pipe is by the use of flanges welded to the ends of the pipe. A sleeve of resinous material, either the same as that of the liner or a resinous material compatible with the liner, can be heat sealed to the resinous liner at each flanged end and flared out over the flange so that a continuous resinous liner in the pipe assembly will result when the flanges are bolted or otherwise secured together. Threaded connections can be made employing a resinous insert pressed into the coupling member so that the resinous insert of the coupling will be pressure sealed to the ends of the resinous liners of the pipe when sections of lined pipe are threaded into the coupling. Welded connections can also be made, particularly if the cement filled annulus is of the proper thickness to result in a weld between the joined ends of the resinous pipe from the heat derived from welding the outer pipe.

The resinous pipe which provides the impermeable, corrosion resistant liner can be any impermeable, substantially rigid resinous material such as the so-called organic plastics including solid polyolefins, nylon, polyvinylchloride, and the like, and mixtures thereof. A particularly preferred class of materials for making the resinous pipe of this invention is the class of solid linear polymers of 1-olefins, particularly linear solid polyethylene and solid copolymers of ethylene and higher olefins such as propylene, 1-butene and the like, prepared by the low pressure polymerization of ethylene or copolymerization of ethylene and a higher molecular weight olefin in the presence of an organic diluent and a solid catalyst. Such polyethylene and copolymers can be prepared by the method described in U.S. Patent 2,825,721, issued March 4, 1958, to J. P. Hogan et al.

The aqueous cement slurry for filling the annulus between the high pressure conduit and the resinous pipe can be made by any of the conventional hydraulic cements such as Portland cement; Portland-Pozzolana cement; calcium-aluminate cement; magnesia cement; and the like. In order to reduce the density of the hydraulic cement slurry, and therefore to discourage the resinous pipe from "floating," it will often be desirable to add low density solids to the cement slurry such as diatomaceous earth, and the like. A high density inert fluid, for example, salt water, will reduce the tendency of the resinous pipe to float in the cement slurry in the annulus between the two pipes. It will usually be advantageous to employ hydraulic cements having a quick setting feature because this will usually assist in keeping the pipe centered.

Although it is not essential that the resinous pipe be centered in the reinforcing conduit it is desirable as an aid in the prevention of air pockets occurring during placement of the cement slurry.

The invention can be applied to short sections of pipe before installation of the pipe; however, it is usually preferred to install the pipe in sections up to about 1000 feet or more and to insert the resinous pipe in the installed pipe and then to cement the resinous pipe in position. The resinous pipe will usually be installed in fairly short sections and these sections will be welded together as they are installed.

Sections of pipe lines more than 600 feet in length have been successfully lined by this procedure using solid polyethylene pipe manufactured according to the process of the above-referred-to U.S. Patent 2,825,721. The sections of pipe which have been lined as described have been in high pressure, corrosive service for several months with no evidence of failure of the polyethylene lining. A Portland-Pozzolana cement slurry was used in positioning the polyethylene lining in the pipe line sections. Corrosion on steel pipes in this area has been so severe that repairs have been required on both plain steel pipe lines and conventional cement-lined pipe lines in service for a shorter time than that of the polyethylene-lined pipes, thus indicating that the polyethylene lined pipes have provided a solution to the corrosion problem in this area.

Reasonable variations and modifications are possible within the scope of this disclosure without departing from the spirit and scope of the invention.

That which is claimed is:

1. A reinforced, corrosion resistant line pipe assembly comprising a steel pipe; a substantially rigid, resinous pipe selected from the group of resinous materials consisting of solid linear polyethylene, a solid linear copolymer of ethylene and propylene, and a solid linear copolymer of ethylene and 1-butene, said resinous pipe being positioned in said steel pipe so as to provide an annulus between said pipes; and a hydrated hydraulic cement substantially filling said annulus.

2. The line pipe of claim 1 wherein the resinous pipe comprises solid linear polyethylene.

3. The line pipe of claim 1 wherein the resinous pipe comprises a solid linear copolymer of ethylene and propylene.

4. The line pipe of claim 1 wherein the resinous pipe comprises a solid linear copolymer of ethylene and 1-butene.

References Cited in the file of this patent

UNITED STATES PATENTS

| | | |
|---|---|---|
| 869,266 | Schwartz | Oct. 29, 1907 |
| 1,709,893 | Bemis | Apr. 23, 1929 |
| 2,050,645 | Briggs | Aug. 11, 1936 |
| 2,120,309 | Carson | June 14, 1938 |
| 2,474,660 | Fitzpatrick | June 28, 1949 |
| 2,516,242 | Munger | July 25, 1950 |
| 2,598,972 | Chappel | June 3, 1952 |
| 2,709,845 | Serkin | June 7, 1955 |
| 2,719,348 | Desnos | Oct. 4, 1955 |
| 2,723,882 | Barnett | Nov. 15, 1955 |
| 2,816,323 | Munger | Dec. 17, 1957 |
| 2,918,394 | Smith | Dec. 22, 1959 |
| 2,932,323 | Aries | Apr. 12, 1960 |
| 2,962,052 | Sergovic | Nov. 29, 1960 |
| 2,971,538 | Brumbach | Feb. 14, 1961 |